US010690101B2

(12) United States Patent
Nelson

(10) Patent No.: US 10,690,101 B2
(45) Date of Patent: Jun. 23, 2020

(54) WHEELED VEHICLE

(71) Applicant: Indian Motorcycle International, LLC, Medina, MN (US)

(72) Inventor: Gordon R. Nelson, Cambridge, MN (US)

(73) Assignee: Indian Motorcycle International, LLC, Medina, MN (US)

( * ) Notice: Subject to any disclaimer, the term of this patent is extended or adjusted under 35 U.S.C. 154(b) by 293 days.

(21) Appl. No.: 15/706,224

(22) Filed: Sep. 15, 2017

(65) Prior Publication Data

US 2019/0085808 A1   Mar. 21, 2019

(51) Int. Cl.
| | |
|---|---|
| *B62K 11/04* | (2006.01) |
| *F02M 69/46* | (2006.01) |
| *F02M 35/16* | (2006.01) |
| *F02B 75/22* | (2006.01) |
| *F02M 35/10* | (2006.01) |
| *F02B 61/02* | (2006.01) |
| *F02B 75/18* | (2006.01) |
| *F02M 35/104* | (2006.01) |

(52) U.S. Cl.
CPC .......... *F02M 69/465* (2013.01); *B62K 11/04* (2013.01); *F02B 61/02* (2013.01); *F02B 75/18* (2013.01); *F02B 75/22* (2013.01); *F02M 35/10216* (2013.01); *F02M 35/162* (2013.01); *F02B 2075/1808* (2013.01); *F02M 35/104* (2013.01)

(58) Field of Classification Search
CPC .......... F02M 69/465; F02M 35/10216; F02M 35/162; B62K 11/04; F02B 61/02; F02B 75/18; F02B 75/22

USPC ......................................................... 180/219
See application file for complete search history.

(56) References Cited

U.S. PATENT DOCUMENTS

| | | | | |
|---|---|---|---|---|
| 4,474,160 A | * | 10/1984 | Gartner | F02M 55/004 123/468 |
| 4,519,368 A | | 5/1985 | Hudson, Jr. | |
| 4,649,884 A | * | 3/1987 | Tuckey | F02M 69/465 123/457 |
| 4,660,524 A | * | 4/1987 | Bertsch | F02M 69/465 123/468 |
| 4,751,904 A | | 6/1988 | Hudson, Jr. | |
| 5,373,824 A | | 12/1994 | Peters et al. | |
| 5,617,827 A | * | 4/1997 | Eshleman | F02M 69/465 123/456 |
| 5,845,621 A | | 12/1998 | Robinson et al. | |
| 5,896,843 A | | 4/1999 | Lorraine | |

(Continued)

FOREIGN PATENT DOCUMENTS

| | | |
|---|---|---|
| CA | 128032 A | 9/1910 |
| CA | 257174 A | 1/1926 |

(Continued)

OTHER PUBLICATIONS

05A—"Fuel Injectors and Pipes, 6.2 L 16 V OHC NA V8 Gas," Ford Motor Company Limited, 2011.

(Continued)

*Primary Examiner* — Jacob D Knutson
(74) *Attorney, Agent, or Firm* — Harness Dickey

(57) ABSTRACT

Disclosed is a vehicle. The vehicle generally includes a frame to support an engine and one or more ground supports, such as wheels, to support the frame. The engine may include an internal combustion power plant and a fuel supply system therefore.

21 Claims, 6 Drawing Sheets

(56) References Cited

U.S. PATENT DOCUMENTS

| | | | |
|---|---|---|---|
| 6,135,092 A | 10/2000 | Schaenzer et al. | |
| 6,230,685 B1 | 5/2001 | Kilgore et al. | |
| 6,418,910 B1 | 7/2002 | Nally et al. | |
| 6,470,859 B2* | 10/2002 | Imura | F02M 55/04 |
| | | | 123/447 |
| 6,615,801 B1 | 9/2003 | Zdroik | |
| 6,651,627 B2 | 11/2003 | Zdroik et al. | |
| 6,725,839 B2 | 4/2004 | Zdroik et al. | |
| 6,871,637 B2 | 3/2005 | Tsuchiya et al. | |
| 6,901,964 B2 | 6/2005 | Kippe et al. | |
| 6,935,314 B2 | 8/2005 | Zdroik et al. | |
| 6,990,959 B1 | 1/2006 | Zdroik et al. | |
| 7,004,151 B2 | 2/2006 | Zdroik | |
| 7,007,673 B2 | 3/2006 | Treusch | |
| 7,028,668 B1* | 4/2006 | West | F02M 55/025 |
| | | | 123/456 |
| 7,093,584 B1 | 8/2006 | Potter et al. | |
| 7,159,570 B2 | 1/2007 | Zdroik | |
| 7,258,108 B2* | 8/2007 | Haraga | F02M 69/465 |
| | | | 123/467 |
| 7,360,524 B2 | 4/2008 | Zdroik et al. | |
| 7,415,970 B2 | 8/2008 | Zdroik et al. | |
| 7,467,618 B2 | 12/2008 | Zdroik et al. | |
| 7,481,205 B2 | 1/2009 | Keeler et al. | |
| 7,493,892 B1* | 2/2009 | Sims, Jr. | F02M 55/025 |
| | | | 123/456 |
| 7,497,202 B2* | 3/2009 | Cvengros | F02M 37/0041 |
| | | | 123/456 |
| 7,669,585 B2 | 3/2010 | Haag et al. | |
| 7,810,471 B2 | 10/2010 | Zdroik | |
| 7,942,136 B2 | 5/2011 | Lepsch et al. | |
| 8,047,182 B2 | 11/2011 | Doherty | |
| 2002/0043249 A1 | 4/2002 | Lee et al. | |
| 2002/0139426 A1 | 10/2002 | Kippe et al. | |
| 2003/0221672 A1 | 12/2003 | Zdroik et al. | |
| 2004/0000291 A1 | 1/2004 | Tsuchiya et al. | |
| 2008/0087253 A1* | 4/2008 | Cvengros | F02M 37/0041 |
| | | | 123/457 |
| 2009/0133676 A1 | 5/2009 | Lepsch et al. | |
| 2011/0197856 A1 | 8/2011 | Harada et al. | |
| 2013/0340713 A1 | 12/2013 | Stahr et al. | |
| 2016/0298807 A1 | 10/2016 | Oltmans | |

FOREIGN PATENT DOCUMENTS

| | | |
|---|---|---|
| CA | 2128192 A1 | 2/1995 |
| EP | 235394 B1 | 4/1989 |
| EP | 1034370 B1 | 3/2002 |
| EP | 1099849 A3 | 5/2002 |
| EP | 1199466 A3 | 4/2003 |
| EP | 886066 B1 | 5/2003 |
| EP | 1817491 A1 | 8/2007 |
| EP | 1915526 B1 | 2/2009 |
| EP | 1888910 B1 | 11/2010 |
| EP | 1812707 B1 | 3/2011 |
| EP | 2655853 B1 | 8/2014 |
| WO | 2009009846 A1 | 1/2009 |
| WO | 2009088865 A2 | 7/2009 |
| WO | 2009088865 A3 | 3/2010 |
| WO | 2012084323 A1 | 6/2012 |

OTHER PUBLICATIONS

International Search Report and Written Opinion for PCT/US2018/050460 dated Jan. 2, 2019, claiming benefit of U.S. Appl. No. 15/706,224, filed Sep. 15, 2017.

* cited by examiner

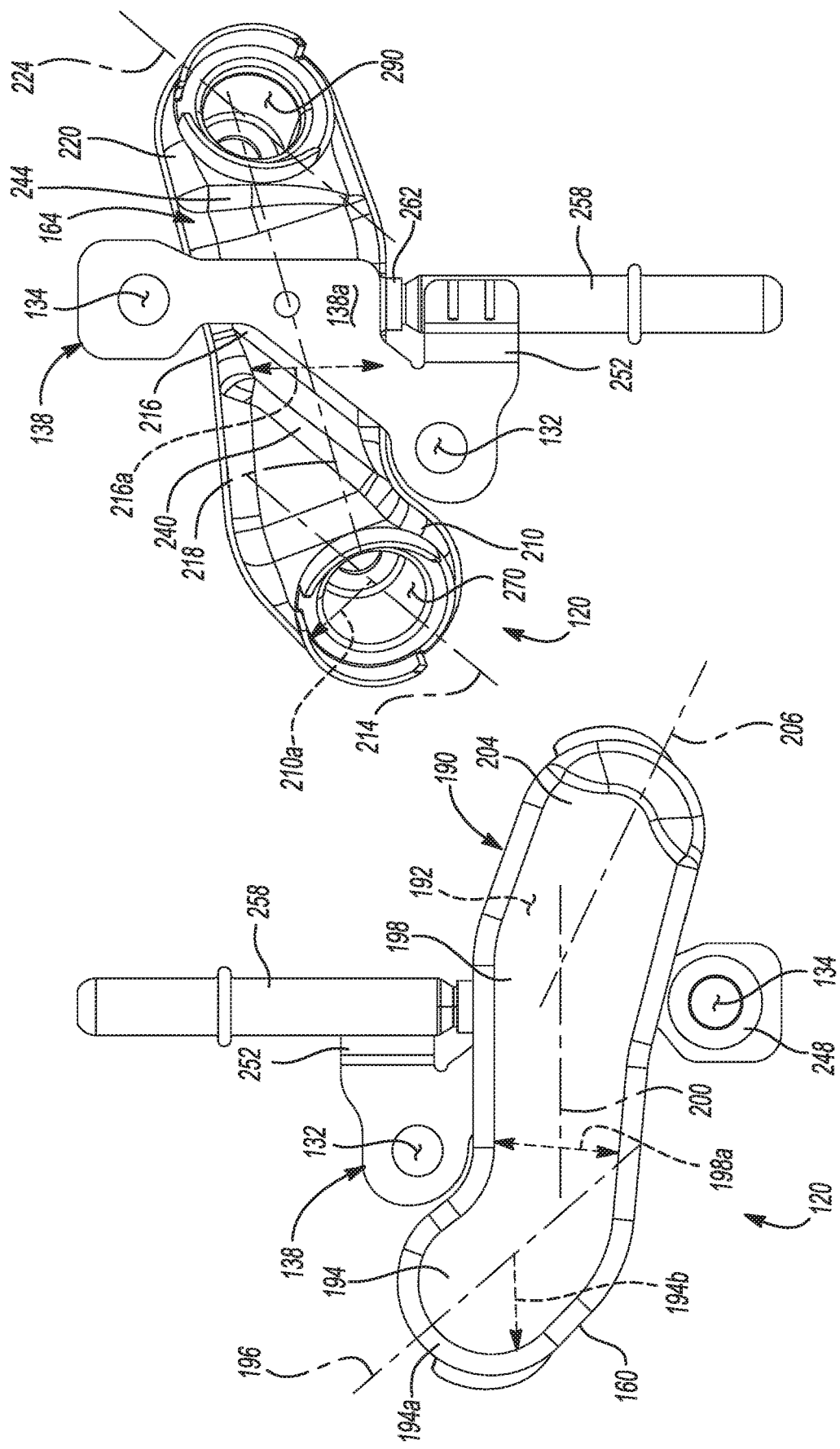

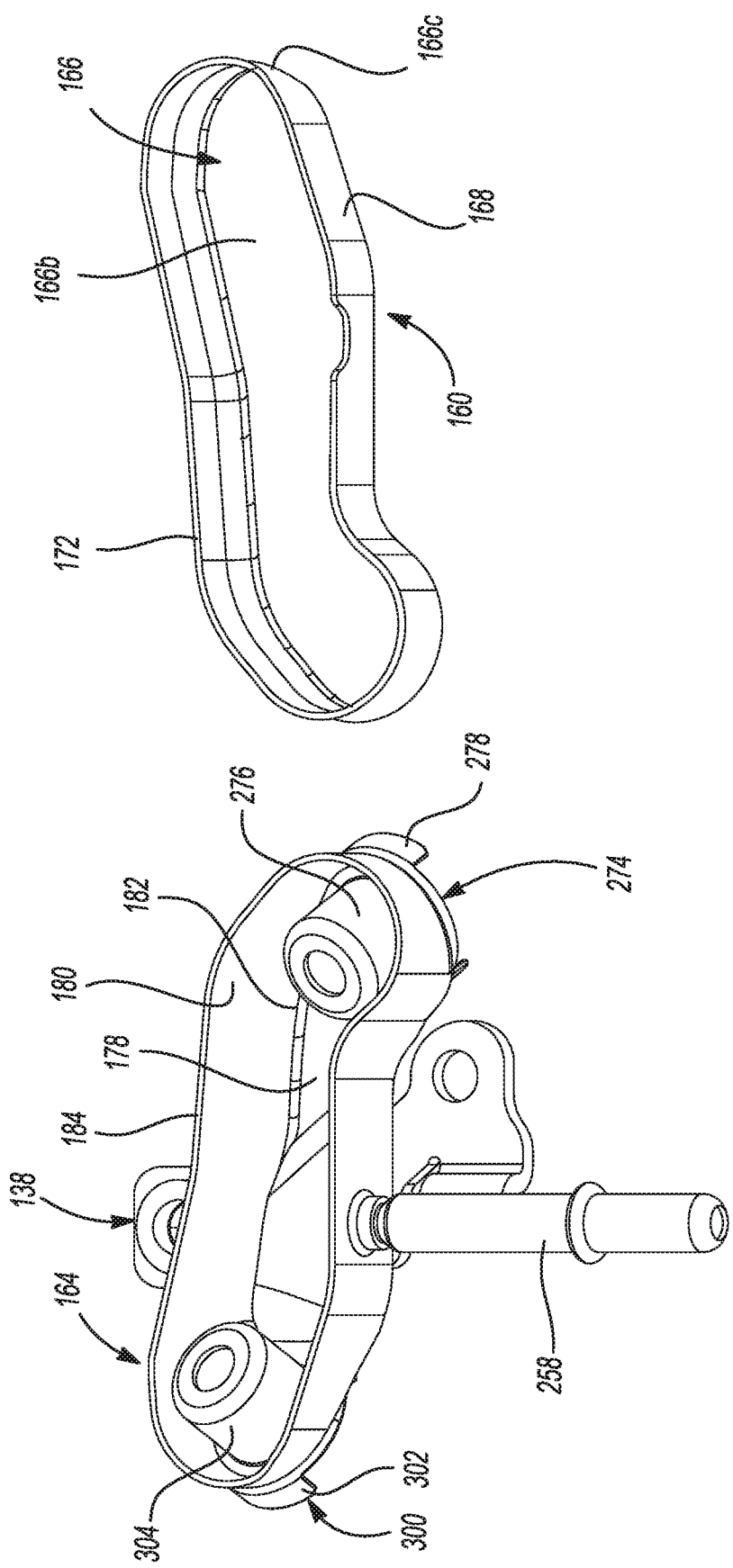

WHEELED VEHICLE

FIELD

The present disclosure relates to a vehicle, and particularly to an engine configuration and/or component for the vehicle.

BACKGROUND

This section provides background information related to the present disclosure which is not necessarily prior art.

A vehicle to move a payload, such as an operator, includes a power plant, such as an engine. The engine may be powered with various materials such as petroleum, gasoline, or other combustible materials. The combustible material is delivered from a fuel tank to a combustion chamber of the engine.

SUMMARY

This section provides a general summary of the disclosure, and is not a comprehensive disclosure of its full scope or all of its features.

Disclosed is a vehicle, such as a wheeled vehicle. The wheeled vehicle may include a first wheel or wheel assembly and a second wheel or wheel assembly. The wheel assemblies are rotatably mounted relative to a frame. The frame may carry or transport a payload, the payload may be an operator/user and/or various cargo compartments. Further, the frame may hold or support a fuel tank, to provide fuel to an engine, and various transmission components to drive at least one of the wheels.

The fuel tank may hold a combustible fuel, such as a petroleum product, that may be transferred to the engine. In the engine, the fuel may be injected or delivered to a combustion chamber to move piston within a cylinder. In various embodiments a fuel holding chamber may hold a volume of fuel prior to injection into one or more combustion chambers. In various embodiments, the fuel chamber may be referred to as a fuel rail. The fuel rail may be formed as a rigid container that is fixably mounted to the engine. In various embodiments, the fuel rail is rigidly mounted to a manifold of the engine and connects to one or more injectors that inject fuel from the fuel rail into the combustion chambers.

In various embodiments, a vehicle assembly is disclosed that includes a frame assembly, at least one wheel assembly rotatably mounted to the frame assembly to support the frame assembly, and an engine supported by the frame and configured to drive the at least one wheel. The engine may include a first cylinder, an air inlet, a manifold having a wall and configured to at least in part direct air from the air inlet to the first cylinder, and a fuel rail having a non-repeating exterior surface to contain fuel at a selected pressure prior to injection into the manifold. The fuel rail may include a first shell member having (i) a first wall having a perimeter and a first portion extending along a first axis and a second portion extending along a second axis, wherein the first axis and the second axis are not aligned and (ii) a second wall extending substantially perpendicular from the first wall at the perimeter. The fuel rail may further include a second shell member having (i) a third wall having a perimeter and a third portion extending along a third axis and a fourth portion extending along a fourth axis, wherein the third axis and the fourth axis are not aligned and (ii) a fourth wall extending substantially perpendicular from the third wall at the perimeter. The second wall of the first shell member is sized to fit within the fourth wall of the second shell member.

In various embodiments, a vehicle assembly is disclosed that includes a fuel rail to contain fuel at a selected pressure prior to injection. The fuel rail may include a first shell member having (i) a first wall having a perimeter and a first portion extending along a first axis and a second portion extending along a second axis, wherein the first axis and the second axis are not aligned and (ii) a second wall extending substantially perpendicular from the first wall at the perimeter and a second shell member having (i) a third wall having a perimeter and a third portion extending along a third axis and a fourth portion extending along a fourth axis, wherein the third axis and the fourth axis are not aligned and (ii) a fourth wall extending substantially perpendicular from the third wall at the perimeter, wherein the second wall of the first shell member is sized to fit over the fourth wall of the second shell member. The fuel rail may further include a first lobe formed of a first lobe portion and second lobe portion near an end of the fuel rail, wherein the first lobe portion is formed by the first shell member on the second axis and wherein the second lobe portion is formed by the second shell member on the fourth axis. The fuel rail may further include a first portal wall portion of the third wall of the second shell member defining a first port generally through the second lobe and a second portal wall portion of the third wall of the second shell member defining a second port, wherein the first portal wall portion defines a first plane and the second portal wall portion defines a second plane and wherein the first plane and the second plane intersect at a portal plane acute angle.

In various embodiments, a method of forming a fuel rail for a vehicle is disclosed that includes forming a fuel holding chamber having a non-repeating exterior surface configuration. The method includes forming a first shell member having (i) a first wall having a perimeter and a first portion extending along a first axis and a second portion extending along a second axis, wherein the first axis and the second axis are not aligned and (ii) a second wall extending substantially perpendicular from the first wall at the perimeter; and forming a second shell member having (i) a third wall having a perimeter and a third portion extending along a third axis and a fourth portion extending along a fourth axis, wherein the third axis and the fourth axis are not aligned and (ii) a fourth wall extending substantially perpendicular from the third wall at the perimeter. The second wall of the first shell member is sized to fit over the fourth wall of the second shell member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a top plan view of a fuel holding chamber, according to various embodiments;

FIG. 5 is a bottom plan view of a fuel holding chamber, according to various embodiments;

FIG. 8 is an interior view of a second member of a fuel holding chamber, according to various embodiments; and FIG. 9 is an interior view of a first member of a fuel holding chamber, according to various embodiments.

Corresponding reference numerals indicate corresponding parts throughout the several views of the drawings.

DETAILED DESCRIPTION

Example embodiments will now be described more fully with reference to the accompanying drawings.

Figure 1:
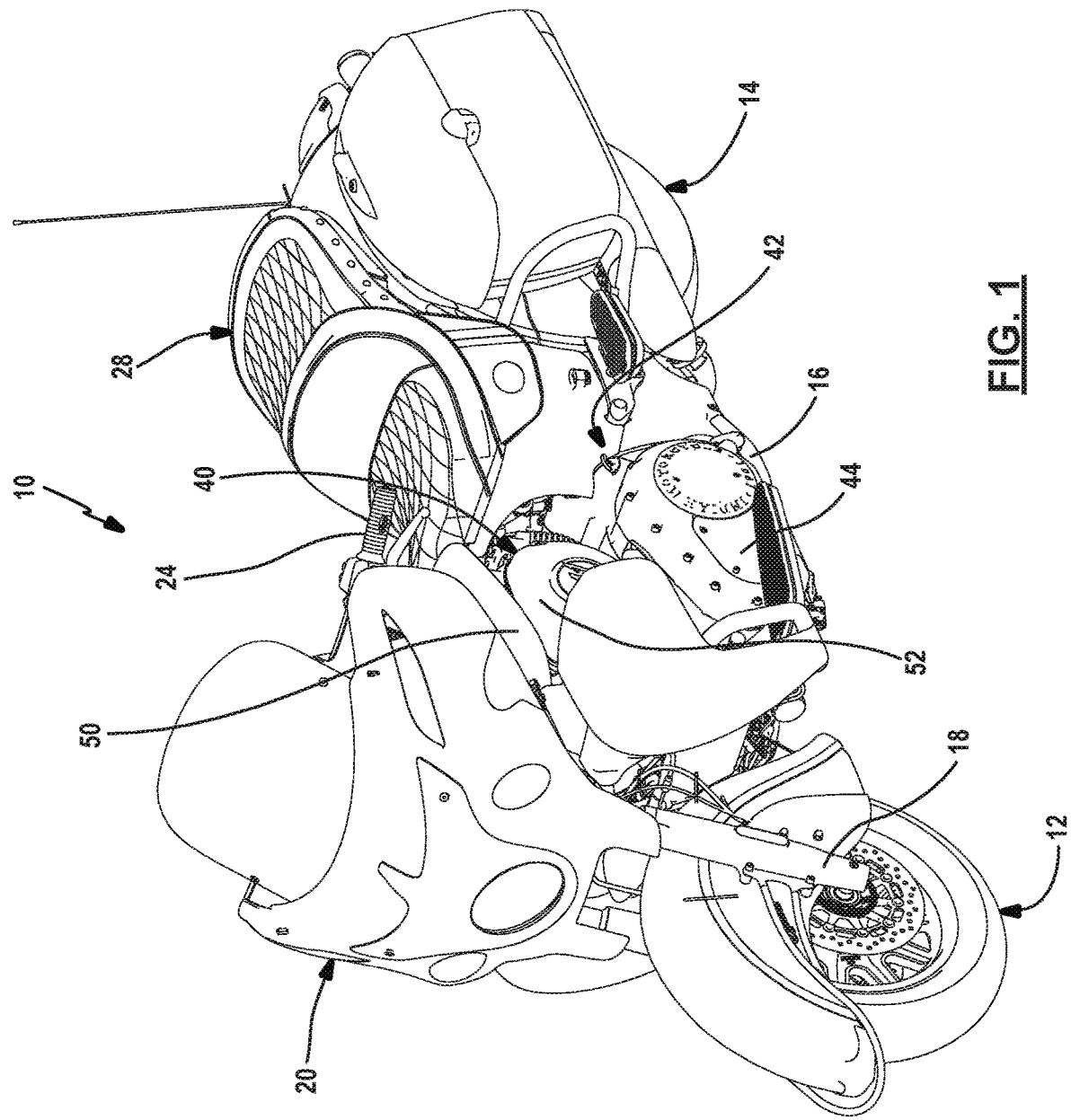
FIG. 1 is a perspective view of a motorcycle, according to various embodiments.

With initial reference to FIG. 1 a vehicle is exemplarily illustrated. The vehicle may include a two wheeled vehicle, which may generally be referred to as a motorcycle 10. The motorcycle 10 may be any appropriate motorcycle, such as the Chieftain® motorcycle or the Roadmaster® motorcycle, both sold by Indian Motorcycle International, LLC having a place of business in Medina, Minn. Further the motorcycle or vehicle may be similar to the vehicle disclosed in U.S. Patent Publication 2016/0298807.

Generally, the motorcycle 10 includes a first wheel 12 and a second wheel 14. Both of the wheels 12, 14 may be provided as wheel assemblies that include a tire, rim, and other generally know components. The wheels 12, 14 may engage a ground or other appropriate surface during operation of the motorcycle 10 and may rotate relative to a frame assembly or structure 16. It is understood that the frame assembly 16 may include various components, including metal tubing and similar components that are connected to other components, such as the wheels 12, 14 suspension components 18, fairing components 20, steering components, such as a handlebar 24, and the like. Further, the frame 16 may support a seat or seat assembly 28 that may be used by an operator to sit on the vehicle 10 during operation.

The frame 16 may hold or support an engine 40. The engine 40 may include various components, such as those discussed further herein, and be a part of a powertrain assembly 42, which may further include transmission components or assembly 44. It is understood that various other components may be incorporated into the vehicle 10, such as those generally understood in the art, to allow operation of the vehicle 10 by a user. The user may operate the vehicle, such as control the engine 40, for transferring power from the engine 40 to one or more of the wheels, such as the second wheel 14, through the transmission 44.

Figure 2:
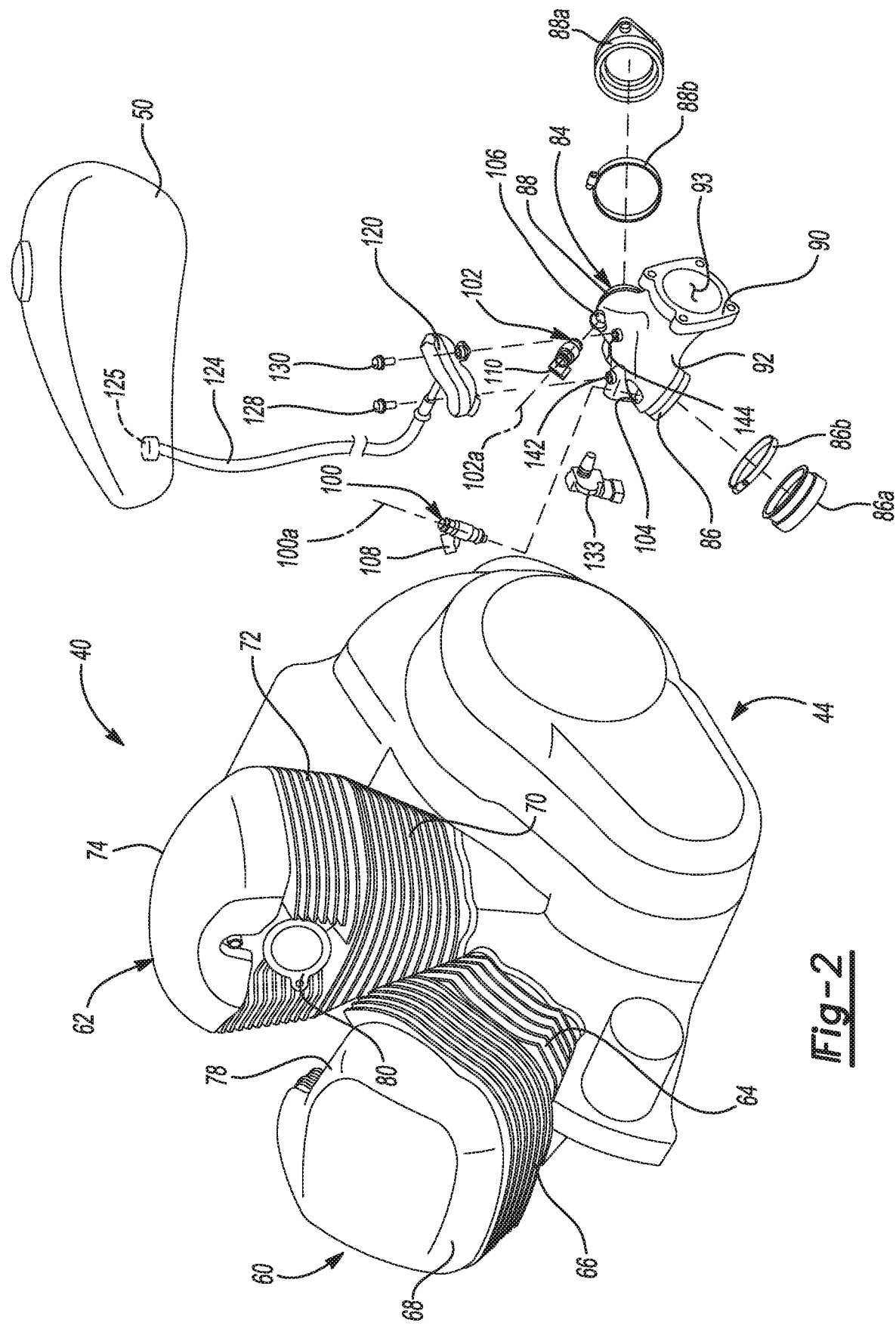
FIG. 2 is a partial exploded view of an engine, according to various embodiments.

In various embodiments the engine 40 may include an engine such as a Thunderstroke® engine sold by Indian Motorcycle International, LLC having a place of business in Medina, Minn. The engine 40 may include a spark ignition engine, where a spark ignites a petroleum product, such as gasoline, to move pistons. The gasoline, or other appropriate fuel, may be held first in a fuel tank 50 for delivery to the engine 40. A throttle body 94 (FIG. 3) is operated by a user to control the airflow or air volume through an air intake assembly 52 into a manifold 84 (FIG. 2).

The engine 40 includes various component including the manifold 84 and the throttle body 94, and other various components. The engine 40 includes one or more combustion chambers in one or more cylinders, including a first cylinder 60 and a second cylinder 62. The first cylinder 60 may be a forward or front cylinder and the second cylinder 62 may a rearward or back cylinder. It is understood, however, that the position of the cylinders 60, 62 is merely exemplary. Moreover each of the cylinders 60, 62 may include various component, including those generally understood in the art, that will not be described in detail here. Nevertheless, the cylinder 60 may include a cylinder portion 64, a cylinder head 66, and a cylinder cover or rocker cover 68. It is understood that the various components of the cylinder 60 may be formed individually or as further separate and individual components and the individual components as discussed above are merely exemplary. The second cylinder 62 may also include the components including a cylinder 70, a cylinder head 72, and a rocker or cylinder cover 74.

Figure 3:
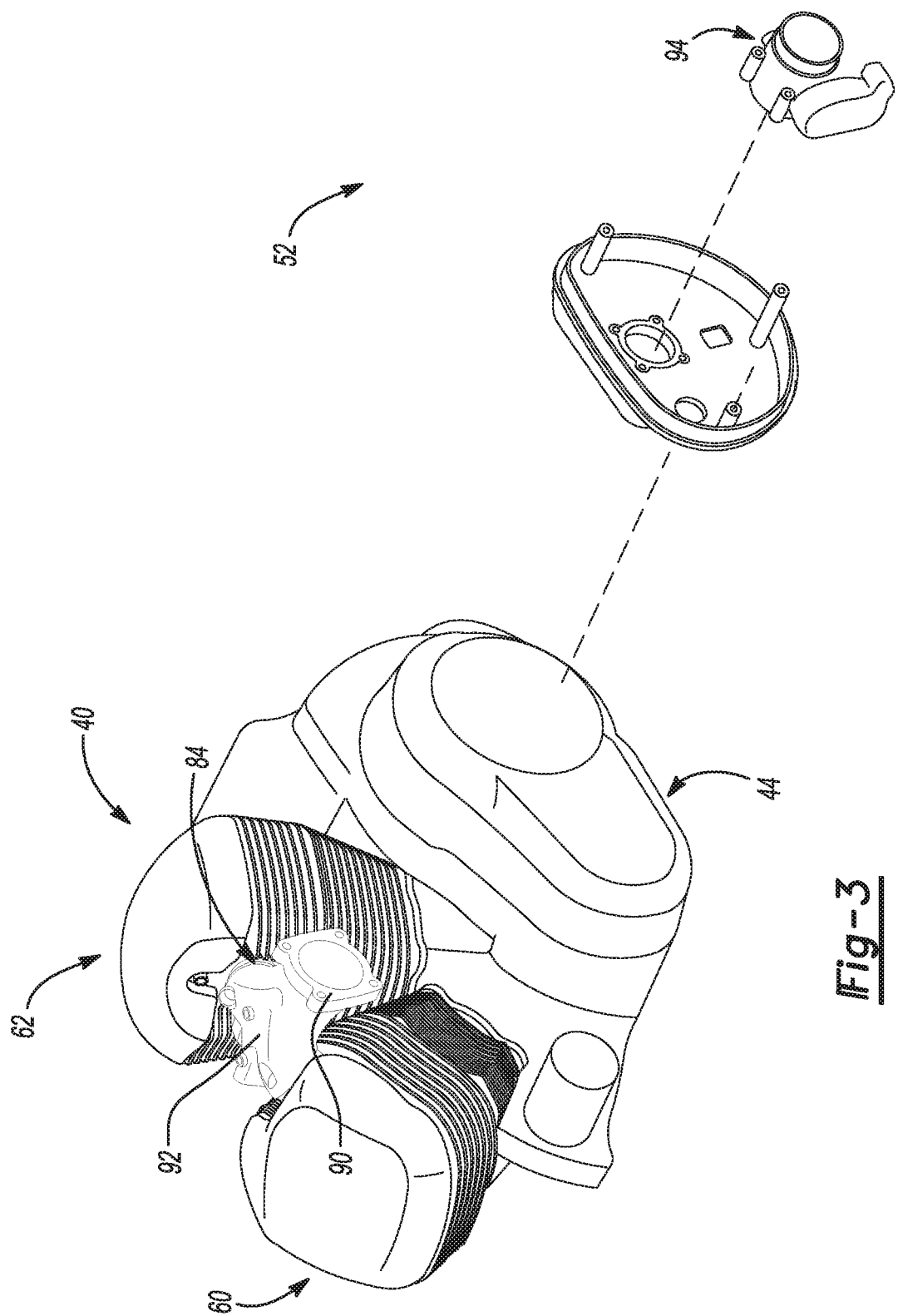
FIG. 3 is a partial exploded view of an engine, according to various embodiments.
Figure 6:
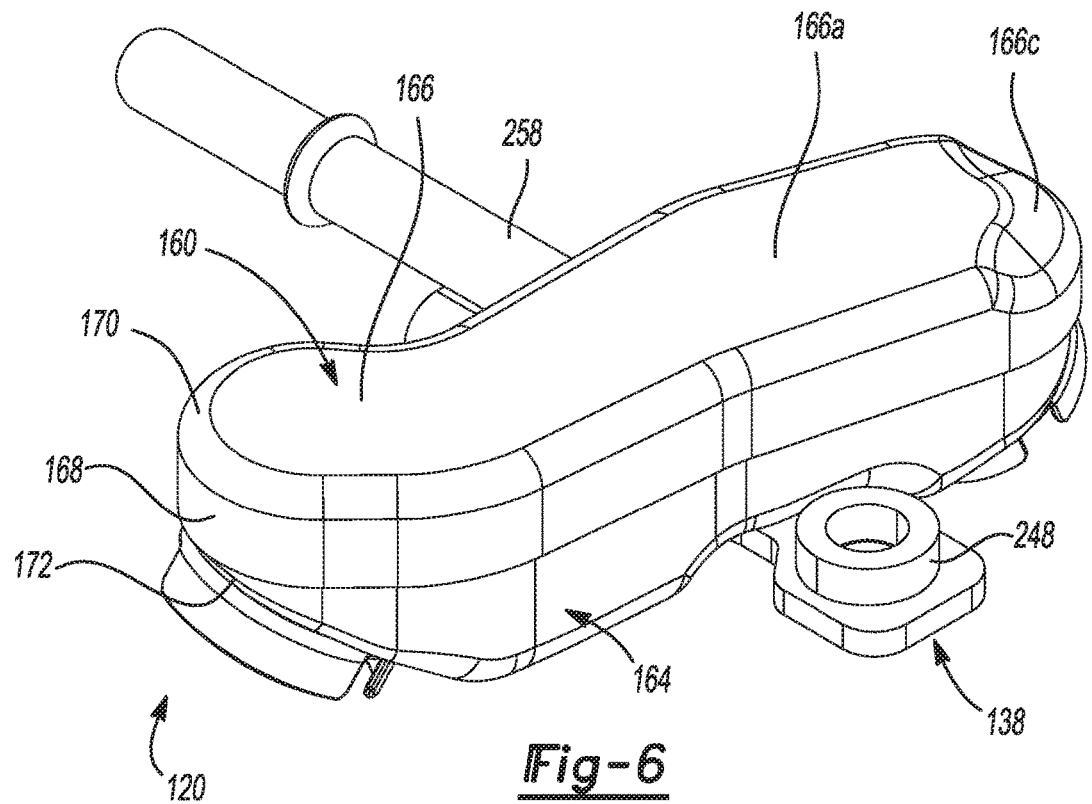
FIG. 6 is a perspective view of a fuel holding chamber, according to various embodiments.
Figure 7:
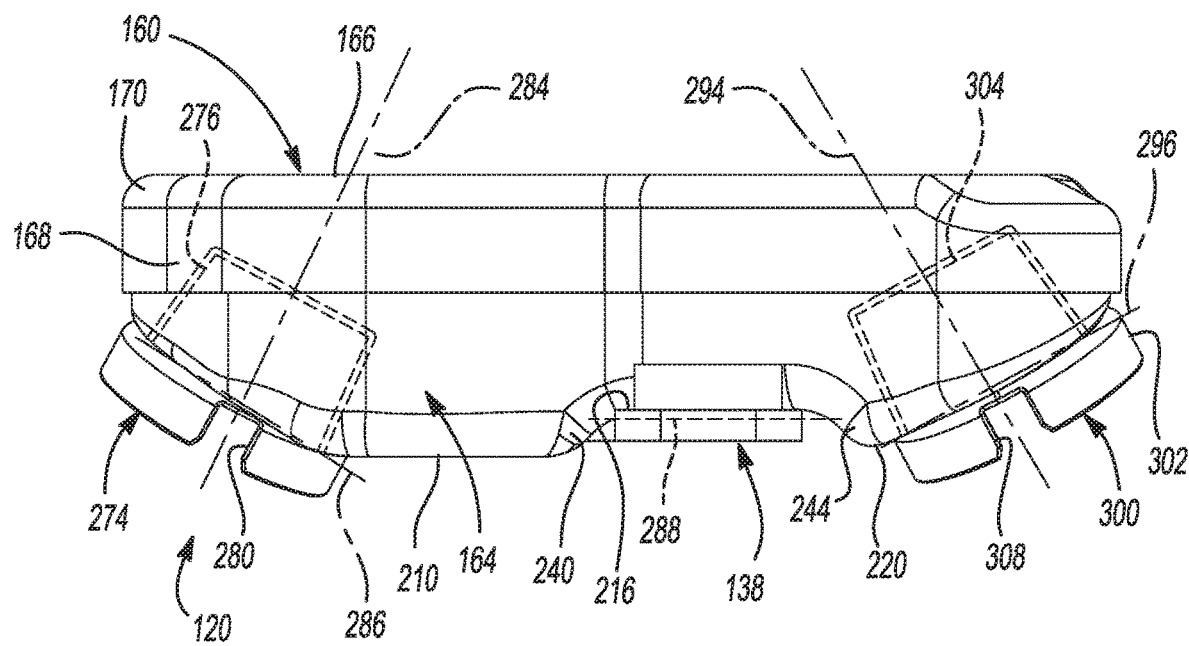
FIG. 7 is a front plan view of a fuel holding chamber, according to various embodiments.

Various portions of the cylinder 60, 62 may include one or more ports or inlet such as a first cylinder inlet or connection port 78, in the first cylinder 60, and a second cylinder inlet or connection port 80, in the second cylinder 62. Configured to be connected to the ports 78, 80 is an air intake manifold 84. The air intake manifold 84 is connected to the respective cylinder 60, 62 via or through outlets including a first manifold outlet 86 and a second manifold outlet 88. Selected connections of the manifold outlets 86, 88 to the ports 78, 80 may include selected and respective adapters 86a, 88a and/or selected and respective band clamps 86b, 88b. The respective adapters 86a, 88a and/or respective band clamps 86b, 88b may assist in providing appropriate tolerances and/or movement of the respective components during assembly and/or operation of the engine 40. The two outlets 86, 88 are connected to a manifold inlet 90 by a wall or body portion 92. The air intake assembly 52, as illustrated in FIG. 3, is connected to the manifold 84 and includes a throttle body 94 controllable by the user to operate the engine 40.

The operator may operate the throttle mechanism, such as at the steering assembly or handlebar 24, which operates the throttle body 94 to allow air into the engine 40. Fuel is delivered based, at least in part, on the position of the throttle in the throttle body 94 and a determined condition for operation of the engine 40. The determined conditions may be stored and controlled by an engine control module (ECM) or other control module.

Fuel is delivered from the fuel tank 50 to manifold 84 through fuel injectors, including a first fuel injector 100 and a second fuel injector 102. The fuel injectors are fit into fuel injector ports 104, 106 in the manifold. The injectors 100, 102 may include connectors, such as respective connectors 108 and 110, to control injection of fuel into the manifold 84, such as via the ECM. The body 92 of the manifold 84 forms or defines an internal volume 93. Fuel is injected into the volume 93 from the fuel tank 50 through the injectors 100, 102. Air also enters the manifold 84 through the air intake 52 and may be at least initially mixed with fuel in the manifold. The mixture is then passed to the cylinder 60, 62 for combustion and operation of powering of the engine 40. The ECM may receive information such as pressure and/or temperature from various sensors, including a MAP or TMAP sensor 133 that is connected to the manifold 84.

In various embodiments an intermediate fuel holding chamber or assembly 120 is operably connected to the injectors 100, 102. The fuel holding chamber 120 may also be generally referred to as a fuel rail. Fuel is held in the fuel chamber 120 for injection into the manifold 84 based upon the control of the respective injectors 100, 102. The fuel holding chamber 120 is generally connected to the fuel tank 50 through a fuel delivery line 124. A pump 125 may be provided to deliver or assist in the delivery of the fuel from the fuel tank 50 to the fuel chamber 120. In various embodiments, the pump 125 is placed in a sump in the fuel tank 50. As discussed herein, the pump 125 may provide the fuel at a selected rate and/or pressure to the fuel chamber 120.

The fuel rail 120 is fixed to the manifold 84 by a selected connection mechanism. In various embodiments, a first connector 128 and a second connector 130 may pass through connection passages or throughbores 132 and 134 formed in a bracket 138 that is connected to the fuel rail 120. In various embodiments only two of the connectors 128, 130 are used to connect the fuel rail 120 to the manifold 84. The two connectors 128, 130 may pass through the bracket 138 in the respective passages or throughbores 132, 134 and engage tapped or threaded bores 142 and 144 formed in the body 92 of the manifold 84. It is understood, however, that while only two of the connectors 128, 130 may be used to hold the fuel rail 120 to the manifold 84, other selected numbers of connectors may be used, such as three, four, or more or only one. Moreover, it understood that connectors 128, 130 may be any appropriate connector such as a bolt, rivet, nut for connection to a stud fixed to the manifold, etc.

With reference to FIG. 4, FIG. 5, FIG. 6, FIG. 7, FIG. 8, and FIG. 9 the fuel rail 120 will be described in greater detail. The fuel rail 120 includes a chamber 190 that has an interior volume 192, as discussed further herein. In various embodiments the chamber of the fuel rail 120 is formed with a first piece or member 160 and a second piece or member 164. In various embodiments the two members 160, 164, may also be referred to as shell members or shell portions, including a top shell member or portion 160 and a bottom shell member or portion 164. The two members 160, 164, when formed as two separate and individual members, may be fit together is also discussed further herein.

The first member 160 includes a first or main wall 166 and has a second wall 168 extending from a perimeter 170 of the first wall 166. The second wall 168 may also be referred to as a side wall and extends to an edge 172. The second member 164 also include a first or main wall 178 that has a second or side wall 180 extending from a perimeter of the first wall 178. The side wall 180 may extend to an edge 184. Generally the respective side walls 168, 180 extends substantially perpendicular at the respective perimeters 170, 182 relative to the respective main or first walls 166, 178.

Generally the first member 160 having the first side wall or first perimeter wall 168 is formed to have a slightly larger internal dimension than the side wall 180 of the second member 164. Thus, the first member 160 may be fit over and onto the second member 164. In various embodiments, the first member 160 and the second member 164 are brazed together, thus a gap is provided between them for the brazing. Generally the gap or dimension between an internal dimension of the first side wall 168 and an external dimension of the second side wall 180 may be about −0.025 mm to about 0.3 mm, and further including about 0.02 mm to about 0.13 mm.

The fuel rail 120, including the two members 160, 164 may be formed of appropriate materials including selected steel alloys including stainless steel alloys. Various stainless steel alloys may include stainless steel alloys having the designation SAE J405 UNS S30403. It is understood, however, that other appropriate materials may be used to form the first member 160 and the second member 164. In various embodiments, forming the first member 160 and the second member 164 from stainless steel alloys allows a selected brazing material and/or technique to ensure a strong and leak proof connection between the first member 160 and the second member 164.

The fuel rail 120 includes the two members 160, 164 that form a main holding chamber assembly 190 that forms or defines the internal volume 192. The holding chamber 190 may be formed in an appropriate shape such as a substantially peanut or bulbous or lobed shape. In various embodiments, the first member 160 is a first lobed or lobe portion 194. Further the first member 160 may include the lobe portion 194 that is formed on or having a radius extending along a first axis 196. The first member 160 may include a second portion 198 that extends along a second axis 200. The first member 160 may further include a third portion 204 that extends along a third axis 206. Each of the axes 196, 200, 206 may not be aligned and, therefore, extend at angles relative to one another. Accordingly, each of the portions 194, 198, 204 may also extend not aligned relative to one another and at angles relative to one another.

In a similar manner, with reference to FIG. 5, the second member 164 may include similar portions. The second member 164, therefore, may include a second lobe or lobed portion 210 that is formed on or has a radius that extends along a first axis 214. The second member 164 further includes a second portion 216 that extends along a second axis 218 and a third portion 220 that extends along a third axis 224. Again, each of the axes 214, 218, 224 may be generally not aligned relative to each other and, therefore, extend at angles relative to one another.

In various embodiments, the chamber 190, therefore, includes or has a non-aligned or non-straight configuration. In various embodiments, non-adjacent or non-contiguous portions, such as the first portion 194 and the third portion 204 of the first member 160, may be substantially parallel with one another, although spaced apart or offset. In such an instance, the first portion 210 and the third portion 220 of the second member 164 may also be parallel to one another, although also spaced apart or offset. Accordingly, it is understood that the first member 160 is generally formed symmetrically relative to the second member 164, at least in an external or exterior shape. This allows the first member 164 to fit over and at small or tight tolerances, as discussed above, with the second member 164.

The first member 160 including the first main wall 166 may be planar or flat over a surface area, including an external surface area 166a and an internal surface area 166b. It is understood that the main wall 166 may include a non-planar portion, such as discontinuous or curved portion 166c. A substantial portion or a majority of the wall 166 is substantially flat or planer. It is further understood that the wall 166 may be substantially planar within a selected range or tolerance, such as including a maximum height or distance from a lowest point of about 1 millimeters (mm), further including about 0.5 mm, and further including about 0.01 to about 0.1 mm. Accordingly the flat portion of the wall 166 may have peaks and values that have a maximum height of about 0.5 mm, thus being substantially flat or planar. The flat portion of the wall 166 may form at least about 98%, including at least about 90%, including at least greater than about 40% of the entire area of the wall 166.

The first member 160 may include substantially radius or curved transitions at the perimeter 170 between the wall 166 and the side wall 168 and between each region or portion 194, 198, and 204. The second member 164 may also generally include curved or radius edges or transitions between the various portions or sections, such as at the perimeter 182 and between the portions 210, 216, and 224.

The portions that have a radius or curve may minimize or eliminate force accumulation points or force focus points. As discussed herein, the fuel rail 120 may form a fuel containment region or volume prior to injection into the manifold 84. The fuel in the fuel rail may be operated at a nominal or average absolute pressure of about 300 kilopascals (kPa) (about 3 bar) to about 500 kPa (about 5 bar), including about 400 kPa (about 4 bar). During an injection cycle, such as when one or more of the injectors 100, 102 is operated to inject fuel into the manifold 84, a change in pressure (e.g. pulsatile pressure) within the internal volume 192 of the fuel rail 120 may cause a change in forces applied to the members 160, 164. The curved regions may substantially eliminate or minimize local forces applied to the members 160, 164.

The lobed portion 194, of the first member 160, may include a curved or rounded edge 194a that has a radius 194b greater than an outer dimension or transverse dimension 198a of the adjacent section 198. Accordingly, the lobed region 194 may appear generally bulbous or expanded relative to the adjacent region 198. The second portion 164 also includes the generally lobed or bulbous portion 210 that includes a radius 210a that is generally greater than a transverse dimension or outer dimension 216a of the adjacent section 216. The lobed portion 210, therefore, also has a generally bulbous or expanded dimension relative to the adjacent region 216.

The second member 164 further includes an uneven or various raised wall portions defined by the main wall 178. For example the first portion 210 includes a raised wall portion 240 relative to the adjacent portion 216. The third portion 220 includes a raised wall 244 relative to the adjacent portion 216. Therefore, the portion 216 may generally include or form a lower valley region between the two portions 210 and 220. The bracket or mounting member 138 generally includes a central region or portion 138a that is fixed to the second or middle portion 216 of the second member 164. The bracket 138 may be fixed to the second member 164 in any appropriate manner such as with welding, brazing, adhesives, or mechanical fasteners.

As discussed above, the bracket 138 forms or defines two mounting holes or throughbores 132 and 134. The throughbores 132, 134 include appropriate dimensions, such as diameters for passage of the fasteners 128, 130 as discussed above. To ensure selected fixation of the fasteners 128, 130 to the manifold 84, various spacers or raised portions 248 may be fixed near or adjacent to one or more of the respective throughbores 132, 134. The bracket 138 may include offset portions, such as an offset leg or arm 252 to engage or hold selected portions such as a conduit 258. The conduit 258 may be an inlet, such as a fuel inlet to the volume 192 from the fuel tank 50. Through the inlet, fuel is provided to the volume 192 of the fuel rail 120 at a selected pressure.

The inlet 258 may be fixed to the fuel rail 120 in a selected manner, such as to the sidewall 184 of the second member 164. In various embodiments, a nipple or throughbore region 262 may be formed by and through the sidewall 184. The inlet conduit 258 is fixed to the chamber 190, such as at the nipple 262, by welding, an adhesive, brazing, or the like. The nipple 262 may be formed by punching from an interior region of the second member 164 through the side wall 184 out from the volume 192. The nipple 262 may be formed, therefore, prior to assembly of the first member 160 to the second member 164. The nipple 262 provides additional support and structure to the inlet 258 to enhance rigidity and longevity of the connection of the inlet conduit 258 to the fuel rail chamber 120.

The second member 164 further includes or defines a first port 270 through the main or first wall 178 and the first region 210. The first port 270 may also be referred to as a fuel or rail port. A first injector cup 274 is fitted in the port 270 and may include an internal rail portion 276 and an external rail portion 278. The external rail portion 278 may form an injector cup and include one or more contact or stop walls 280 to engage one or more of the respective injectors 100, 102. The injector cup 274 is fixed to the second member 164 with an appropriate fixation mechanism, such as welding, adhesives, brazing. Therefore the injector, such as the injector 100, may be held at a selected position, such as a selected rotational position relative to the fuel rail 120 after assembly of the fuel rail 120 to the manifold 84. In other words, the injector cup 274 may engage and/or capture the injector 100/102.

The port 270 is formed through the first portion 210 or portal wall around a central or portal axis 284. The axis 284 is generally through or perpendicular to a plane 286 that is formed by or is defined by at least a portion of the first portion 210. The axis 284 and the plane 286 may generally be formed at an angle relative to a longitudinal axis, such as an axis defined or formed by the edge 172, of the first member 160. The middle or second portion 216 of the second member may form or define a plane 288 that is also at an angle relative to the plane 286.

The third region 220 may also form or define a second portal 290 in a portal wall of the third region. The second portal 290 may also be referred to as a fuel or rail portal. The second portal 290 may also be formed around a portal axis 294 that is substantially perpendicular to a plane 296 formed or defined by at least a portion of the third region 220.

The plane 286 is also generally non-parallel with and may form an obtuse portal angle relative to the plane 288 of the second region 216. The planes 286 and 288 may intersect at the angle outside of the second region 216. The plane 286 may also be non-aligned and form an acute portal angle with the plane 286 of the first region 210. The plane 286 and 296 may not intersect to form the angle in either of the portions 210, 220. The axes 284 and 294 of the respective portals 270, 290 may generally be formed to be aligned with respective longitudinal axes 100a, 102a of the respective injectors 100, 102. Therefore the injectors 100, 102 may be positioned within the respective portals 270, 290.

The fuel rail 120, as discussed above, therefore may have various portions or sections that are non-linear, non-symmetrical, or not aligned with each other. For example, the first section 190 of the first member and the third section 204 of the first member 160 may be not aligned or parallel with one another. In various embodiments, however, the first section 194 and the third section 204 may be not aligned, but parallel and offset or spaced apart. The mating sections of the second member 164 may also be formed in a similar or identical configuration as the first member 160 for mating of the first member 160 and the second member 164. Thus, the fuel rail 120 may not be formed to extend along a single longitudinal axis, as discussed above. The fuel rail 120, while having the non-aligned portions, further need not have an exterior surface that has a repeating or continuous pattern. The fuel rail 120 may have only the portions discussed above, such as the lobed portion 194 and the second and third sections 198, 204 of the first member 160 and the respective portions of the second member 164. The fuel rail 120, however, is formed to have an exterior surface, as discussed above, which has close tolerances to adjacent portions of the engine 40 while having the internal volume 192 that is relatively large.

A second injector cup 300 is fitted within the second portal 290. The second injector cup 300 includes an external or injector engaging cup portion 302 and an internal portion 304, similar to the first injector cup 274. The second injector cup 300 may also include stop or engagement walls 308 to engage a respective one of the injectors 100, 102. Thus, the injector cups 274, 300 may rotationally fix the respective injectors 100, 102 to the fuel rail 120.

As discussed above the fuel rail 120, including the first member 160 and second member 164, may be formed with selected material, including selected stainless steel alloys as discussed above. The bracket 138 and the inlet 258 may also be formed of materials identical to the materials of the first member 160 and the second member 164. In various embodiments, each of the respective portions may be formed of different materials. In addition, each of the portions may be formed in an appropriate manner. In various embodiments, the first member 160 and the second member 164 may be stamped from appropriately sized blanks of the selected material. The first and second members 160, 164 may be stamped from blanks or stock material having a thickness of about 0.7 mm to about 1.0 mm, including about 0.84 mm to about 0.94 mm. In various embodiments, the stock material may be selected to be within the standard for ASTM 20 gauge stainless steel.

The fuel rail 120, when formed of a plurality of individual pieces, may then be assembled or formed together in an appropriate manner. For example, the injector cups 274, 300 may be brazed into the ports 270, 290 at the respective portions 210, 220 in an appropriate manner. The first member 160 may then be brazed with the second member 164. The inlet 258 may also be brazed to the nipple 262. The fuel rail 120, therefore, may enclose a volume of about 10,000 mm$^3$ to about 50,000 mm$^3$, including about 28,860 mm$^3$.

The bracket 138 is also brazed to the second member 164 and the inlet 258. The bracket 138, therefore, supports the inlet relative to the first member 160 and the second member 164. The bracket 138, including the throughbores 132, 134, also allows fixation of the fuel rail 120 to the manifold 84 while also supporting the inlet 258 relative to the manifold 84 and the chamber assembly 190 of the first and second member 160, 164. The fixation of the fuel rail 120 to the manifold 84 also rotationally fixes the injectors 100, 102 relative to the manifold 84 and the fuel rail 120 by engaging the injectors 100, 102 with the respective injector cups 274, 300. As illustrated, with reference to FIGS. 2 and 5, the bracket 138 allows mounting of the fuel rail 120 at points or in a line substantially between the ports 270, 290 and generally transverse to an axis, such as the axis 200, of the fuel rail 120.

As discussed above, the fuel system of the engine 40 may generally provide the fuel at a selected pressure to the manifold 84. Initially, the fuel pump 125 may pressurize the fuel form the tank 50 to the line 124 at a selected operating pressure, which is an absolute pressure, of about 400 kPa. The injectors 100, 102 inject fuel from the fuel rail 120 at a selected time and rate based upon operation of the engine 40 and selected inputs from the ECM or other appropriate modules. The injection may alter the pressure within the fuel rail 120 from the pump formed pressure of about 400 kPa.

The fuel rail 120, including the substantially flat main wall 166 having the substantially flat respective internal and external surfaces 166a, 166b may generally damp or reduce forces experienced on or in the fuel rail 120 due to the injection of fuel into the manifold 84 through the injectors 100, 102. Moreover, the volume of the fuel rail 120 may also work to assist to damp the or reduce the forces on or within the fuel rail 120.

The motorcycle 10 includes a fuel system, such as including the fuel pump 125, supply line 124 and the fuel rail 120. The fuel system, including within the supply line 124 and the fuel rail 120 may be pressurized and generally operated at a nominal pressure of about 400 kPa absolute pressure. The pressure may change, however, such as pulsatile pressures may exist during, before, and after injection events. A pressure trace (i.e. change in pressure over time) within the fuel rail 120, however, may be about 675 kPa to about 350 kPa, further including about 650 kPa to about 360 kPa, and further including about 675 kPa to about 342 kPa. Generally, the fuel rail 120 may allow the pressure to have a selected fluctuation (i.e. above or below) from the nominal fuel system pressure during a selected steady state operation of the engine 40. The steady state of the engine 40 may include any given crank angle of the engine. The selected pressure fluctuation may have a maximum fluctuation of about 100 kPa to about 200 kPa, including about 160 kPa from the nominal fuel system pressure.

Without being bound by the theory, the fuel rail 120, including the first member 160 having the main wall 166 having the substantially flat internal surface 166b allows for and/or assists in maintain a substantially constant pressure trace (i.e. the selected pressure fluctuation) over various timing and operational ranges of the engine 40 to allow for appropriate and selected calibration of the engine 40 for operational use. The fuel rail 120, including the selected volume, as discussed above, may also or alternatively allow for or assist in maintaining the substantially constant pressure trace (i.e. the selected pressure fluctuation) over various timing and operational ranges of the engine 40 to allow for appropriate and selected calibration of the engine 40 for operational use. The Accordingly, the fuel rail 120 is configured to maintain a pressure trace that has a maximum pulsatile pressure or selected pressure fluctuation of no more than about 50% of the operational or nominal pressure. The selected and consistent pressure trace may be maintained by the fuel rail 120 alone without additional dampers. In various embodiments, only the fuel rail 120 (including only the main wall 166 having the substantially flat internal surface 166b and/or the selected volume and/or the main wall 178 of the second member 164) allows for the selected pressure fluctuation. This may also reduce connections to achieve a selected pressure trace.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise.

What is claimed is:

1. A vehicle assembly, comprising:
   a frame assembly;
   at least one wheel assembly rotatably mounted to the frame assembly to support the frame assembly;
   an engine supported by the frame and configured to drive the at least one wheel;
   wherein the engine comprises,
      a first cylinder;
      an air inlet;
      a manifold having a wall and configured to at least in part direct air from the air inlet to the first cylinder;
      a fuel rail having a non-repeating exterior surface to contain fuel at a selected pressure prior to injection into the manifold;
   wherein the fuel rail comprises,
      a first shell member having (i) a first wall having a perimeter and a first portion extending along a first axis and a second portion extending along a second axis, wherein the first axis and the second axis are not aligned and (ii) a second wall extending substantially perpendicular from the first wall at the perimeter,
      a second shell member having (i) a third wall having a perimeter and a third portion extending along a third axis and a fourth portion extending along a fourth axis, wherein the third axis and the fourth axis are not aligned and (ii) a fourth wall extending substantially perpendicular from the third wall at the perimeter; and
      wherein the second wall of the first shell member is sized to fit within the fourth wall of the second shell member.

2. The vehicle of claim 1, wherein the fuel rail further comprises:
   a first lobe formed of a first lobe portion and second lobe portion near an end of the fuel rail;
   wherein the first lobe portion is formed by the first shell member on the second axis;
   wherein the second lobe portion is formed by the second shell member on the fourth axis.

3. The vehicle of claim 2, wherein the first wall of the first shell member extends along a fifth axis;
   wherein the first axis, the second axis, and the fifth axis are non-aligned;
   the third wall of the second shell member extending along a sixth axis;
   wherein the third axis, the fourth axis, and the sixth axis are non-aligned.

4. The vehicle of claim 1, wherein the fuel rail further comprises:
   a first portal wall portion of the third wall of the second shell member defining a first port;
   a second portal wall portion of the third wall of the second shell member defining a second port;
   wherein the first portal wall portion defines a first plane and the second portal wall portion defines a second plane;
   wherein the first plane and the second plane intersect at a portal plane acute angle.

5. The vehicle of claim 4, wherein the first port is defined around a first port axis;
   wherein the second port is defined around a second port axis;
   wherein the first port axis and the second port axis intersect at a port acute angle.

6. The vehicle of claim 1, wherein the first wall is substantially planar.

7. The vehicle of claim 1, wherein the first wall of the first shell member extends along a fifth axis;
   wherein the first wall is planar over the area of the first wall extending along the second axis and the fifth axis;
   wherein the first wall is configured to maintain a selected pressure trace within the fuel rail during operation of the engine.

8. The vehicle of claim 1, wherein the first cylinder includes a first cylinder head and a first cylinder port;
   wherein the manifold is connected to the first cylinder head to direct flow of air and fuel into the first cylinder.

9. The vehicle of claim 8, wherein the engine further comprises a second cylinder that includes a second cylinder head and a second cylinder port;
   wherein the manifold is connected to both the first cylinder head and the second cylinder head to direct flow of air and fuel into the first cylinder and the second cylinder;
   wherein the fuel rail is mounted to the manifold between the first cylinder head and the second cylinder head;
   wherein the manifold includes a first mounting bore and a second mounting bore.

10. The vehicle of claim 9, wherein the fuel rail further comprises:
    a first portal wall portion of the third wall of the second shell member defining a first port;
    a second portal wall portion of the third wall of the second shell member defining a second port;
    wherein the first portal wall portion defines a first plane and the second portal wall portion defines a second plane;
    wherein the first plane and the second plane intersect at a portal plane acute angle; and
    a mounting bracket fixed to a bracket wall portion of the third wall of the second shell member;
    wherein the bracket wall portion is substantially planar and defines a third plane, wherein the third plane defines a first obtuse angle with the first plane and a second obtuse angle with the second plane.

11. A vehicle assembly, comprising:
    a fuel rail to contain fuel at a selected pressure prior to injection;
    wherein the fuel rail comprises,
       a first shell member having (i) a first wall having a perimeter and a first portion extending along a first axis and a second portion extending along a second axis, wherein the first axis and the second axis are not aligned and (ii) a second wall extending substantially perpendicular from the first wall at the perimeter,
       a second shell member having (i) a third wall having a perimeter and a third portion extending along a third axis and a fourth portion extending along a fourth axis, wherein the third axis and the fourth axis are not aligned and (ii) a fourth wall extending substantially perpendicular from the third wall at the perimeter, wherein the second wall of the first shell member is sized to fit over the fourth wall of the second shell member;
a first lobe formed of a first lobe portion and second lobe portion near an end of the fuel rail;
wherein the first lobe portion is formed by the first shell member on the second axis;
wherein the second lobe portion is formed by the second shell member on the fourth axis;
a first portal wall portion of the third wall of the second shell member defining a first port generally through the second lobe;
a second portal wall portion of the third wall of the second shell member defining a second port;
wherein the first portal wall portion defines a first plane and the second portal wall portion defines a second plane; and
wherein the first plane and the second plane intersect at a portal plane acute angle.

12. The vehicle of claim 11, wherein the first wall of the first shell member extends along a fifth axis;
wherein the first axis, the second axis, and the fifth axis are non-aligned;
the third wall of the second shell member extending along a sixth axis;
wherein the third axis, the fourth axis, and the sixth axis are non-aligned.

13. The vehicle of claim 12, wherein the first port is defined around a first port axis;
wherein the second port is defined around a second port axis;
wherein the first port axis and the second port axis intersect at a port acute angle.

14. The vehicle of claim 13, further comprising:
a frame assembly;
at least one wheel assembly rotatably mounted to the frame assembly to support the frame assembly;
an engine supported by the frame and configured to drive the at least one wheel assembly;
wherein the engine comprises,
a first cylinder;
a second cylinder;
an air inlet;
a manifold having a wall and configured to at least in part direct air from the air inlet to the first cylinder and the second cylinder;
wherein the fuel rail is mounted to the manifold between the first cylinder and the second cylinder;
wherein at least one of the first wall or a volume of the fuel rail is configured to have a selected pressure fluctuation from the selected pressure.

15. The vehicle of claim 14, wherein the fuel rail further comprises:
a mounting bracket fixed to a bracket wall portion of the third wall of the second shell member;
wherein the bracket wall portion is substantially planar and defines a third plane, wherein the third plane defines a first obtuse angle with the first plane and a second obtuse angle with the second plane;
wherein the fuel rail is mounted to the manifold with a first fixing member and a second fixing member via the mounting bracket.

16. A method of forming a fuel rail for a vehicle, comprising:
forming a fuel holding chamber having a non-repeating exterior surface configuration, including
forming a first shell member having (i) a first wall having a perimeter and a first portion extending along a first axis and a second portion extending along a second axis, wherein the first axis and the second axis are not aligned and (ii) a second wall extending substantially perpendicular from the first wall at the perimeter; and
forming a second shell member having (i) a third wall having a perimeter and a third portion extending along a third axis and a fourth portion extending along a fourth axis, wherein the third axis and the fourth axis are not aligned and (ii) a fourth wall extending substantially perpendicular from the third wall at the perimeter;
wherein the second wall of the first shell member is sized to fit over the fourth wall of the second shell member.

17. The method of claim 16, further comprising:
forming a first portal wall portion of the third wall of the second shell member;
forming a first port in the first portal wall;
forming a second portal wall portion of the third wall of the second shell member;
forming a second port in the second portal wall;
wherein the first portal wall portion defines a first plane and the second portal wall portion defines a second plane;
wherein the first plane and the second plane intersect at a portal plane acute angle.

18. The method of claim 17, further comprising:
forming a bracket wall portion that is substantially planar and defines a third plane between the first portal wall portion and the second portal wall portion; and
fixing a mounting bracket to the bracket wall portion of the third wall of the second shell member.

19. The method of claim 18, wherein forming the bracket wall portion includes forming the third plane to define a first obtuse angle with the first plane and a second obtuse angle with the second plane.

20. The method of claim 18, further comprising:
fixing the fuel rail to a manifold with a first fixation member and a second fixation member passing through the mounting bracket.

21. The method of claim 20, further comprising:
aligning the first port in the first portal wall with a first fuel injector mounted in the manifold; and
aligning the second port in the second portal wall with a second fuel injector mounted in the manifold.

* * * * *